US005104470A

United States Patent [19]

Ritchie

[11] Patent Number: 5,104,470

[45] Date of Patent: Apr. 14, 1992

[54] METHOD FOR MOISTENING ENVELOPES

[75] Inventor: Wayne W. Ritchie, Fairfield, Conn.

[73] Assignee: Pitney Bowes Inc., Stamford, Conn.

[21] Appl. No.: 560,903

[22] Filed: Jul. 30, 1990

[51] Int. Cl.[5] ........................... B43M 5/04; C09J 5/02

[52] U.S. Cl. ................................ 156/227; 156/308.8; 156/442.1; 156/442.2; 156/443

[58] Field of Search .................. 156/441.5, 442.2, 568, 156/566, 567, 442.1, 443, 446, 227, 308.8; 53/284.3; 493/917, 186; 118/32

[56] References Cited

U.S. PATENT DOCUMENTS 342,821 6/1886 Brown .
401,713 4/1889 Richards .
556,942 3/1896 Talbot .............................. 156/441.5
888,460 5/1908 Bowes .............................. 156/442.2
2,620,609 12/1952 Pope .
3,989,579 11/1976 Sheldon ......................... 156/568 X
4,380,210 4/1983 Auerbach .
4,462,199 7/1984 Polit .

FOREIGN PATENT DOCUMENTS 806513 2/1969 Canada ............................ 156/441.5

*Primary Examiner*—Jeff H. Aftergut
*Attorney, Agent, or Firm*—Charles R. Malandra, Jr.; David E. Pitchenik; Melvin J. Scolnick

[57] ABSTRACT

A method of moistening an envelope having a curved flap with a glue portion on the periphery thereof. The method includes: rotating the envelope in a plane containing the envelope; in the course of the rotating, contacting the glue portion of the flap with a moistening device; and thereafter urging the glue portion of the flap against the body of the envelope to thereby form a seal.

5 Claims, 3 Drawing Sheets

METHOD FOR MOISTENING ENVELOPES

The instant invention relates to a method for moistening the flap of an envelope, and more particularly, to such a method used in conjunction with the turning of the envelope.

In mail handling machines, moistening devices are used to wet the flap of an envelope in preparation for sealing the envelope. Conventionally, this wetting is done by feeding the envelopes past a stripper blade having a moistening wick associated therewith, which allows the wick to come into contact with the glue on the envelope flap. The water causes the glue to soften and become tacky to the touch. The envelopes are then fed between two sealing rollers which press the flap against the envelope body to form the seal. The envelope is then either ejected into a stacker or passed on to another part of the mail handling machine for further processing, such as the printing of postage on the envelope.

Mail handling machines are commonly employed at the output end of envelope inserting apparatus (also known as envelope stuffers) which inserts various documents situated in document feeders into an envelope. However, since the envelope typically emerges from the inserting apparatus with its length oriented perpendicular to the path of travel, it becomes necessary to turn the envelope 90 degrees (or 180 degrees if it is also desired to change the direction of the path of travel) in order to have the length of the envelope oriented parallel to the path of travel, which is necessary for the printing of postage on the envelope. In these inserter applications, the moistening and sealing of the envelopes is generally achieved downstream of the turning device used to rotate the envelope 90 degrees. However, it is also a fact that the moistening device wets not only the glue of the envelope flap but also applies excess water to the inside of the flap which is frequently then transferred to the documents contained within the envelope.

The instant invention overcomes the problems associated with the use of a moistening device in connection with envelopes being transported therethrough in a straight path by taking advantage of the rotary motion of the turning device.

SUMMARY OF THE INVENTION

Accordingly, the instant invention provides a method of moistening an envelope having a curved flap with a glue portion on the periphery thereof. The method comprises: rotating the envelope in a plane containing the envelope; in the course of the rotating, contacting the glue portion of the flap with a moistening device; and thereafter urging the glue portion of the flap against the body of the envelope to thereby form a seal.

DETAILED DESCRIPTION OF THE PREFERRED EMBODIMENT

Figure 1:
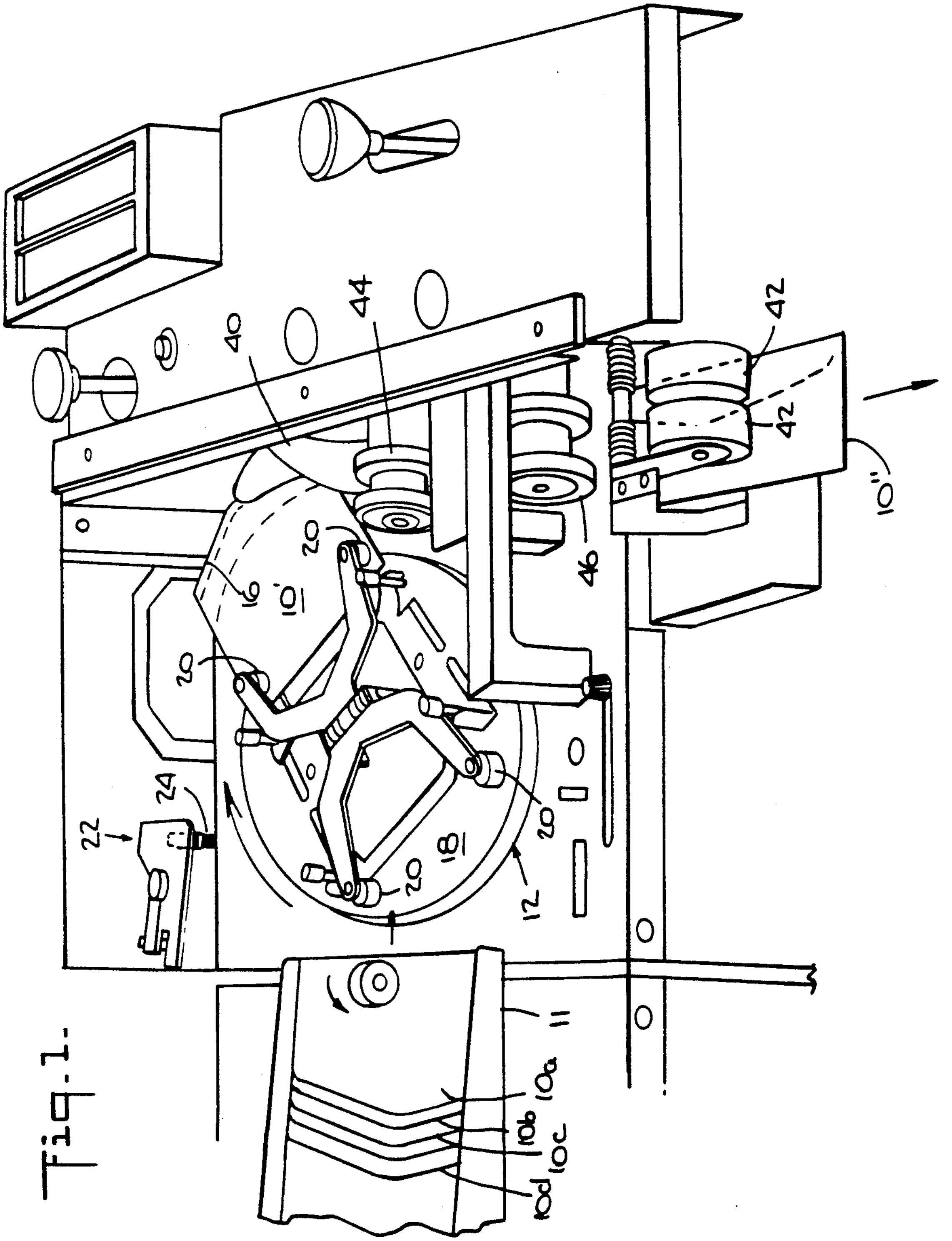
FIG. 1 is a perspective view of a turning device and a moistening device for an envelope in accordance with the instant invention.

In describing the preferred embodiment of the instant invention, reference is made to the drawings, wherein there is seen in FIG. 1 a series of envelopes **10*a*, 10*b*, 10*c*, 10*d*, etc. exiting a guide 11 secured to an envelope inserting machine (not shown) and about to be rotated 180° by an envelope turning device 12 in order to change the orientation of travel of the envelope 12 by 90°, i.e. from the envelope length being perpendicular to the path of travel to the length being parallel to the path of travel and an additional 90° in order to change the path of travel by 90°. In FIG. 1, an envelope 10′ having a curved flap 16 is seen being rotated 180° in a horizontal plane by the envelope turner 12 which is a gripper type and well known in the art. The envelope is flapped, i.e., the flap is unfolded. The turner 12 includes a rotatable disc 18 and four translatable gripping members 20 for grabbing hold of the envelopes 10*a*, 10*b*, etc. as they exit the guide 11 and are rotated 180° at which point the gripping members 20 release the envelopes 10*a*, 10*b***, etc. for further processing.

In the course of being rotated 180°, each of the flapped envelopes **10*a*, 10*b*, etc. passes through a moistening device 22 situated about 90° downstream from the guide 11 about the periphery of the turner 12. The moistening device 22 is adjustably mounted so that it can accommodate various widths of envelopes, and includes a moistening brush 24 for contacting the glue portion 26 of the envelope flap 28 (see FIG. 2). A removable, adjustable pressure plate 30 is situated above the moistening brush 24 in order to urge the envelope flaps against the brush 24 and thereby wet the glue portion 26. The brush 24 is removably mounted in a brush holder and reservoir 32**.

Figure 3:
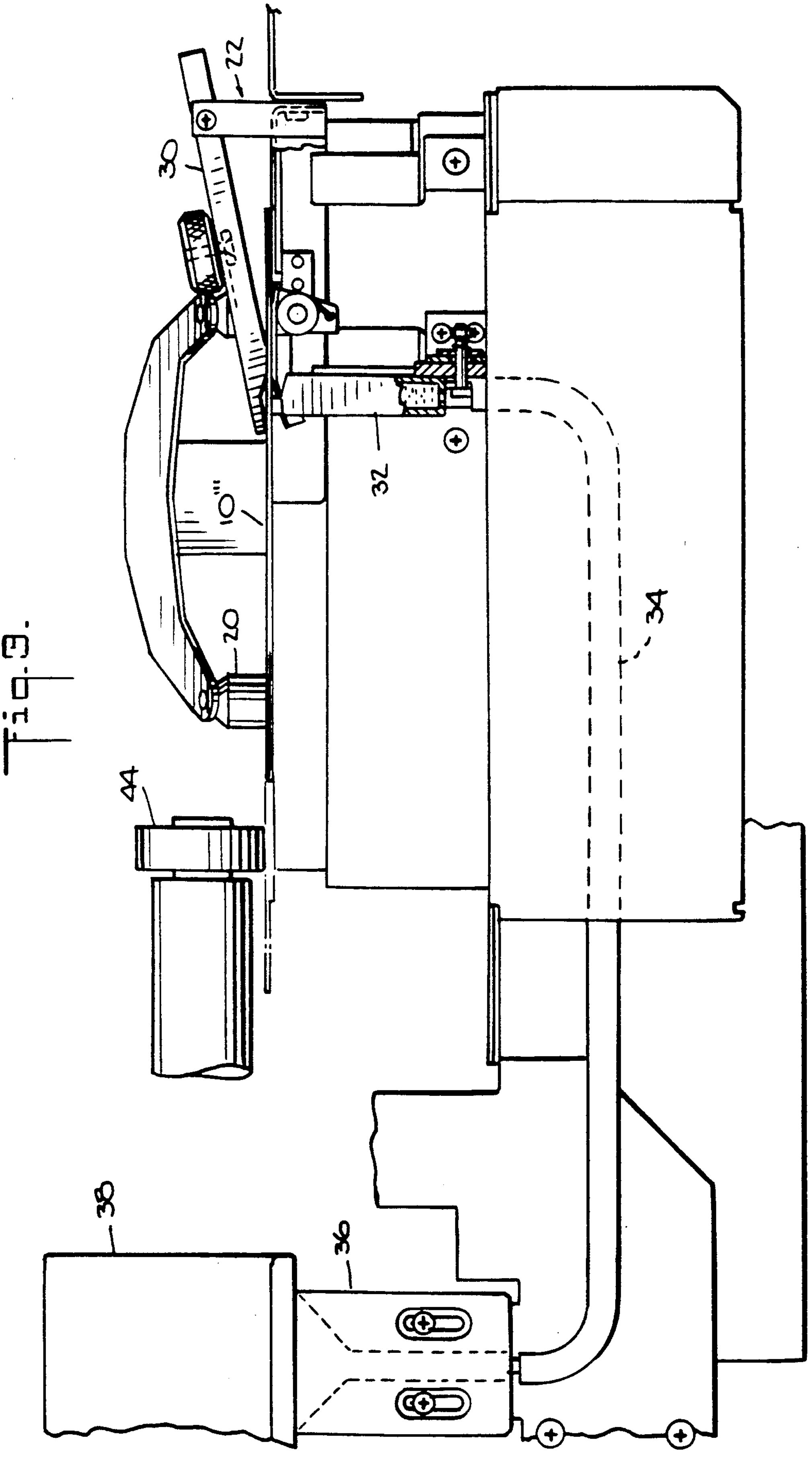
FIG. 3 is an elevational view of the apparatus seen in FIG. 2.

A hose 34 connects the reservoir 32 to chicken feeder water supply 36 having a water bottle 38 mounted thereabove (see FIG. 3). Situated 90° downstream from the moistener 22 is a guide 40 for assuring that the envelopes are guided from the moistener 22 to a pair of sealing rollers 42. The envelopes are fed to the sealing rollers 42 by a pair of feed rollers 44 and 46. As best seen in FIG. 1, an envelope 10″ is seen emerging from the sealing rollers 42.

Figure 2:
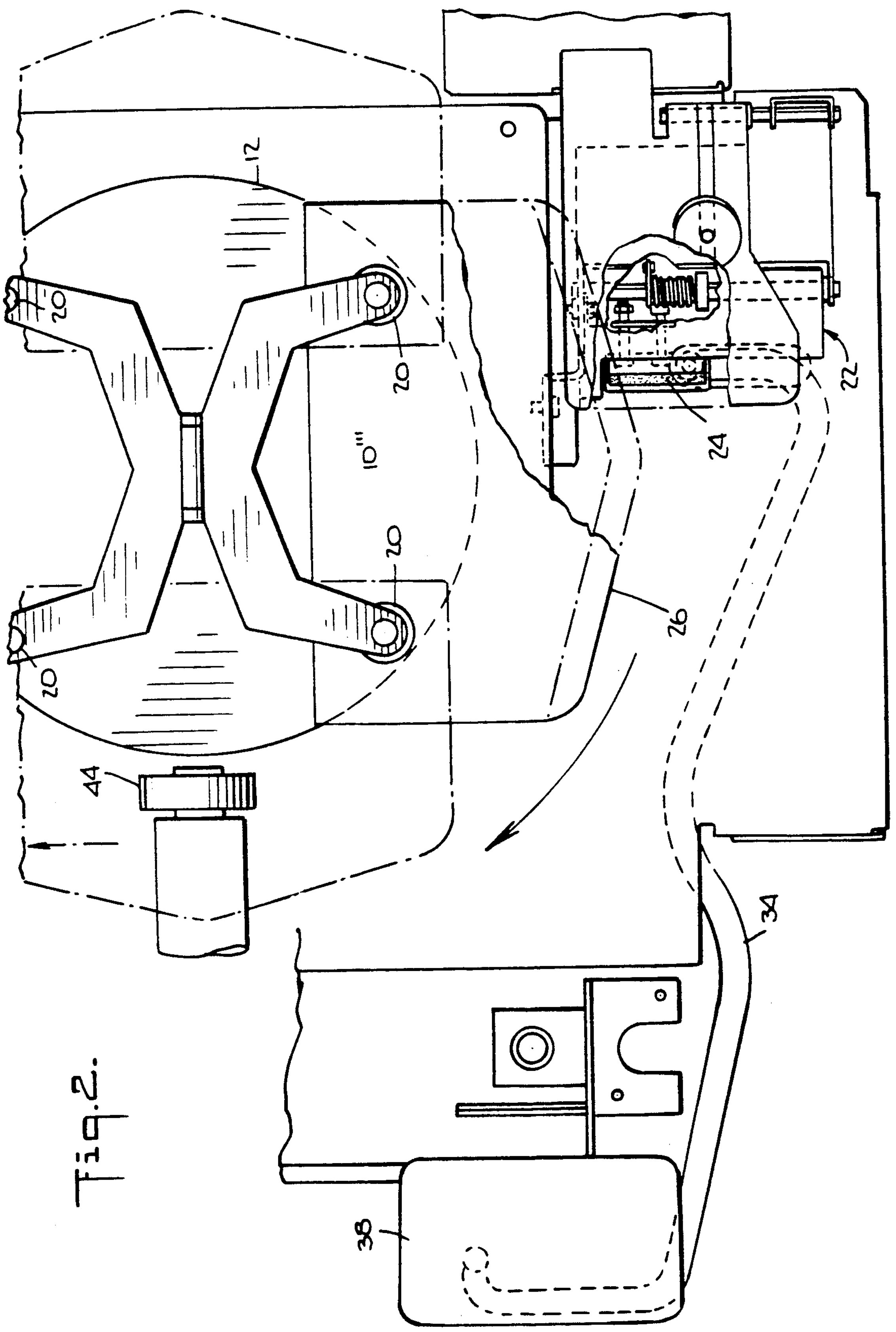
FIG. 2 is a top plan view of the apparatus seen in FIG. 1.

Referring now to FIG. 2, an envelope 10‴ is seen passing through the moistener 22. It can be seen that virtually only the glue portion 26 of the envelope flap 16 is contacted by the stationary moistening brush 24 because the flap 16 is rotating as it traverses the brush 24 thereby providing an arc of moisture to the flap 16.

It should be understood by those skilled in the art that various modifications may be made in the present invention without departing from the spirit and scope thereof, as described in the specification and defined in the appended claims.

What is claimed is:

1. A method of moistening a flap of an envelope having a body and a curved flap with a glue portion on the periphery thereof, comprising:

- feeding the envelope into a rotating device with the envelope flap extended;
- rotating said envelope in a plane containing said envelope with said rotating device;
- in the course of said rotating, contacting the glue portion of said extended flap with a stationary moistening device thereby applying moisture in an arc to said curved flap;

folding said flap to a folded condition; and urging said glue portion of said flap against the body of said envelope to thereby form a seal.

2. The method of claim 1, wherein said rotating comprises a 90° turn.

3. The method of claim 1, wherein said rotating comprises a 180° turn.

4. The method of claim 1, wherein said plane is substantially horizontal.

5. The method of claim 4, wherein said rotating is effected by a gripper envelope turner.

* * * * *